No. 642,645. Patented Feb. 6, 1900.
J. R. THOMAS & H. S. SPENCER.
BORING MACHINE.
(Application filed Feb. 20, 1899.)

(No Model.) 5 Sheets—Sheet 1.

Witnesses:
Emil Rupp
Parke S. Johnson

Inventors:
John R. Thomas
Harry S. Spencer

No. 642,645. Patented Feb. 6, 1900.
J. R. THOMAS & H. S. SPENCER.
BORING MACHINE.
(Application filed Feb. 20, 1899.)
(No Model.) 5 Sheets—Sheet 2.

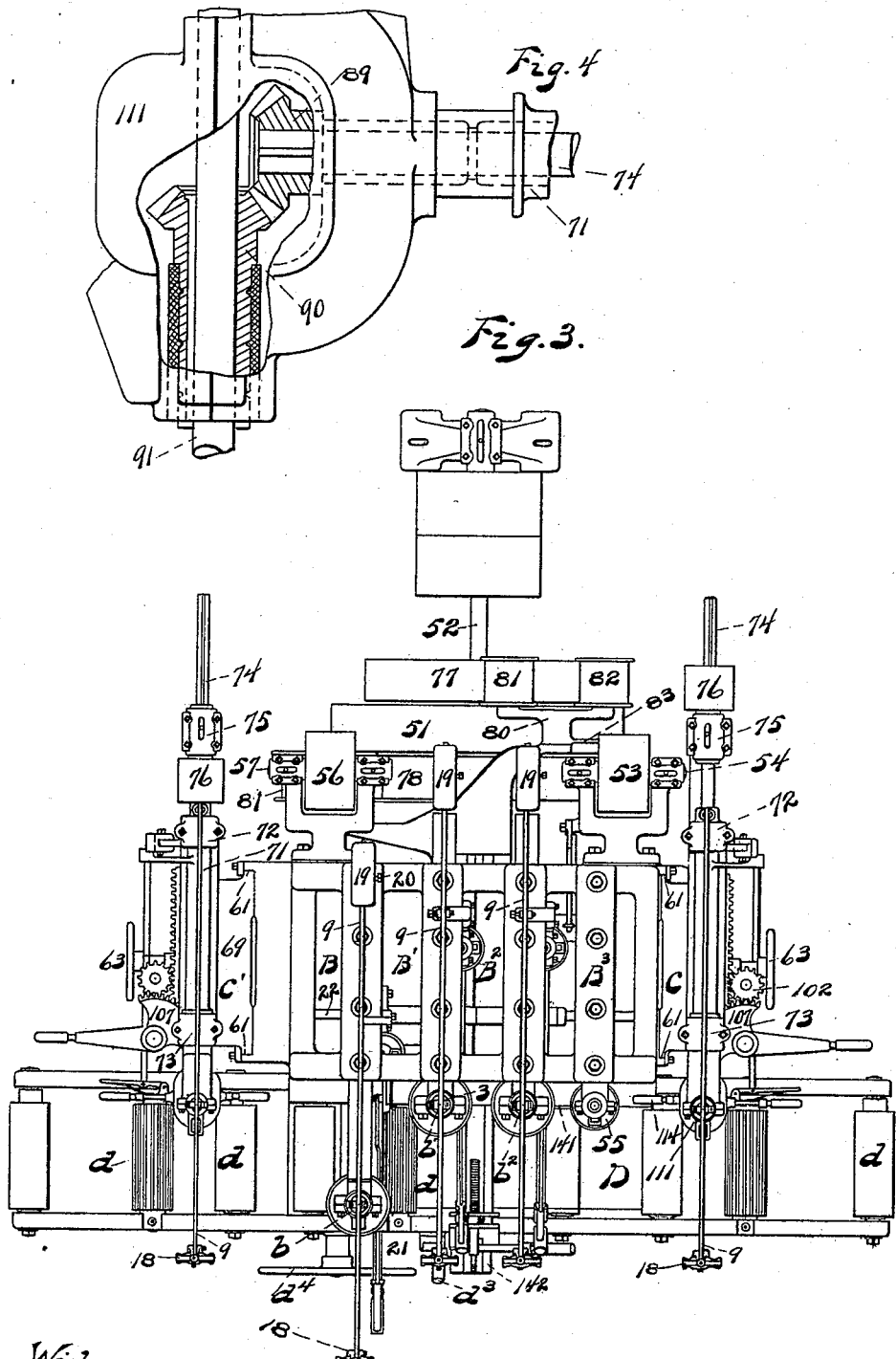

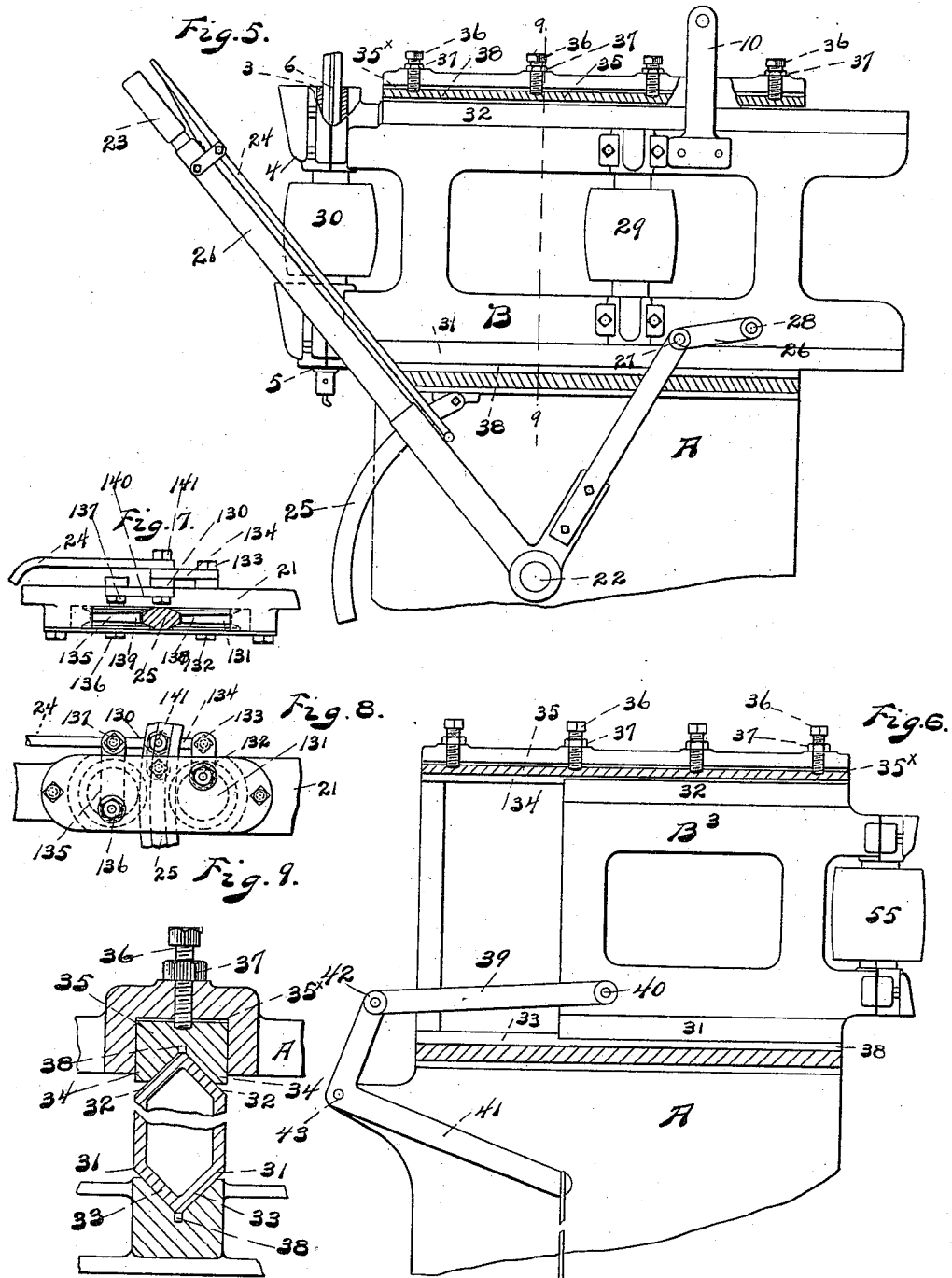

No. 642,645. Patented Feb. 6, 1900.
J. R. THOMAS & H. S. SPENCER.
BORING MACHINE.
(Application filed Feb. 20, 1899.)
(No Model.) 5 Sheets—Sheet 5.
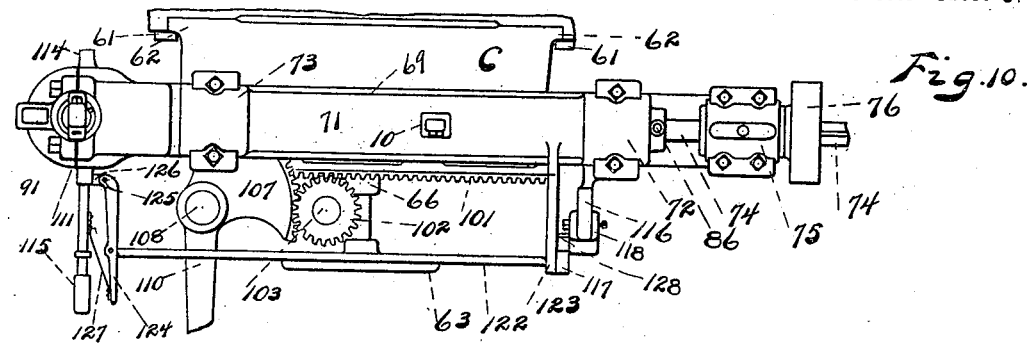
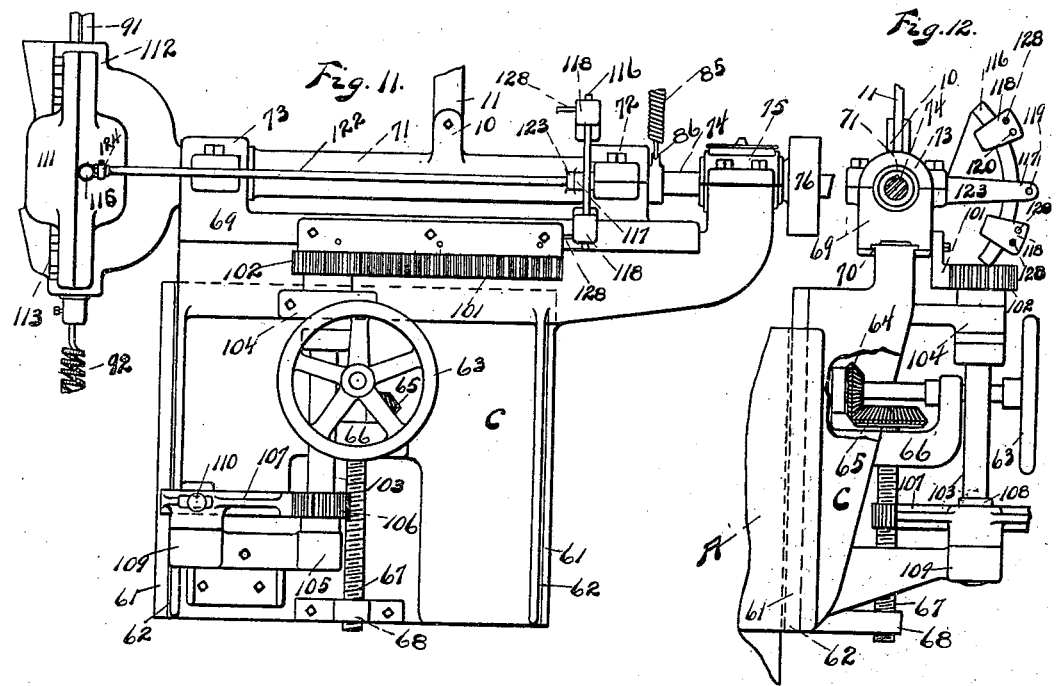
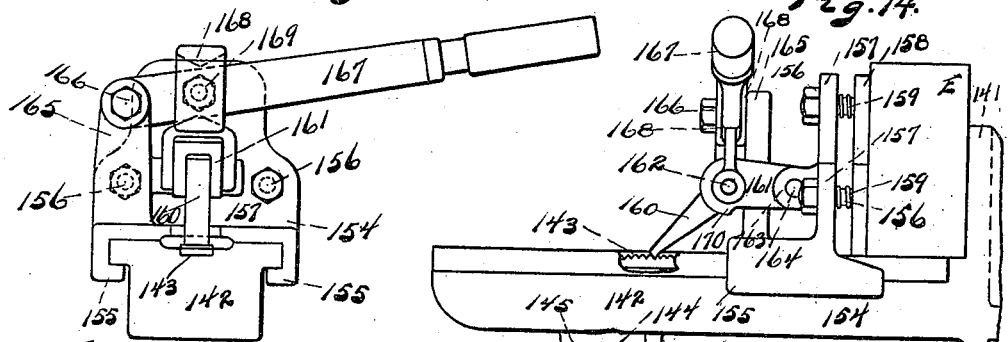
Witnesses:
Emil Capp
Parke S. Johnson
Inventors:
John R. Thomas
Harry S. Spencer
by B. F. Hertzlich, their Atty.

UNITED STATES PATENT OFFICE.

JOHN R. THOMAS, OF CINCINNATI, AND HARRY S. SPENCER, OF BOND HILL, OHIO, ASSIGNORS TO THE J. A. FAY & EGAN COMPANY, OF CINCINNATI, OHIO.

BORING-MACHINE.

SPECIFICATION forming part of Letters Patent No. 642,645, dated February 6, 1900.

Application filed February 20, 1899. Serial No. 706,227. (No model.)

*To all whom it may concern:*

Be it known that we, JOHN R. THOMAS, residing at Cincinnati, and HARRY S. SPENCER, residing at Bond Hill, in the county of Hamilton and State of Ohio, citizens of the United States, have invented certain new and useful Improvements in Boring-Machines, of which the following is a specification.

Our invention relates particularly to that class of boring-machines having a plurality of spindles; and it consists in so constructing the machine that one or more of the boring-spindles may be placed at an angle with relation to the other or others and its bearings adjusted in such manner that an increase in length of auger is not necessary in order to reach the work when boring at an angle, in the improved methods of ram construction, in the improved means for holding the stock to be worked, and in the various parts and arrangement and combinations of parts hereinafter more fully described and claimed.

We do not in this application claim the clamping devices for the spindle-rams herein shown and described, but embody that subject-matter in a divisional application more fully showing, describing, and claiming the same, and reference is hereby made to the said divisional application, being Serial No. 727,924½, filed August 21, 1899.

Figure 1:
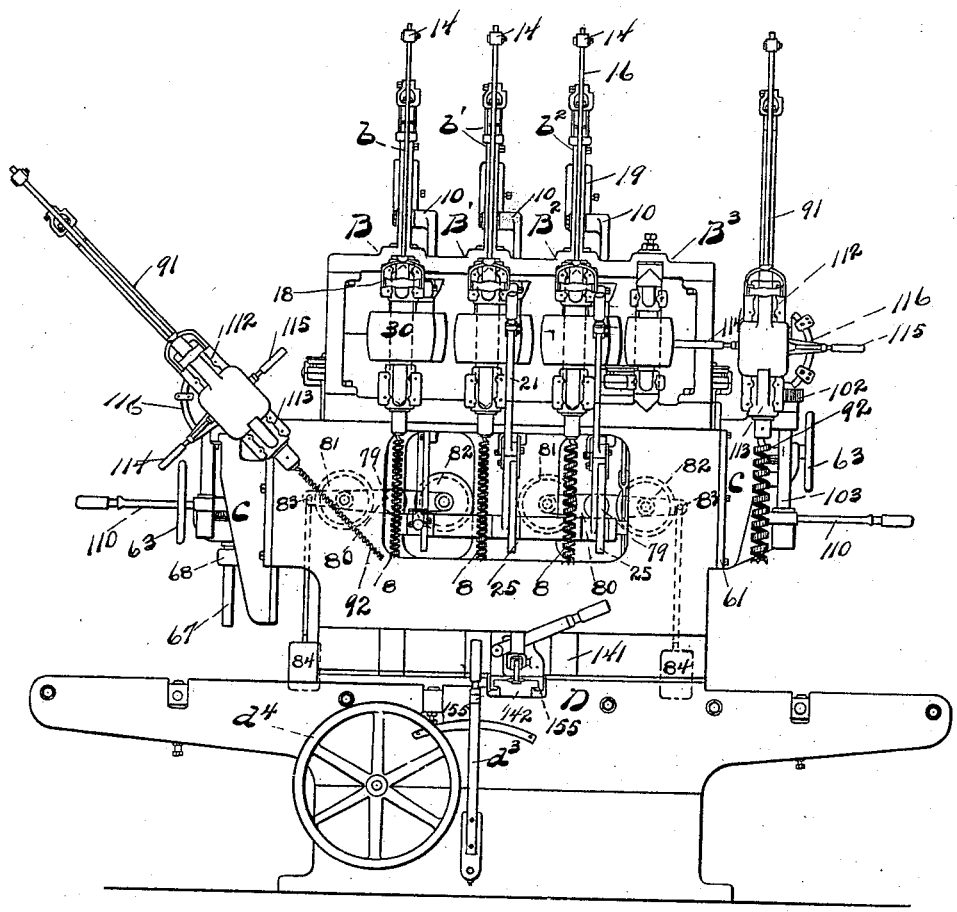
Figure 2:
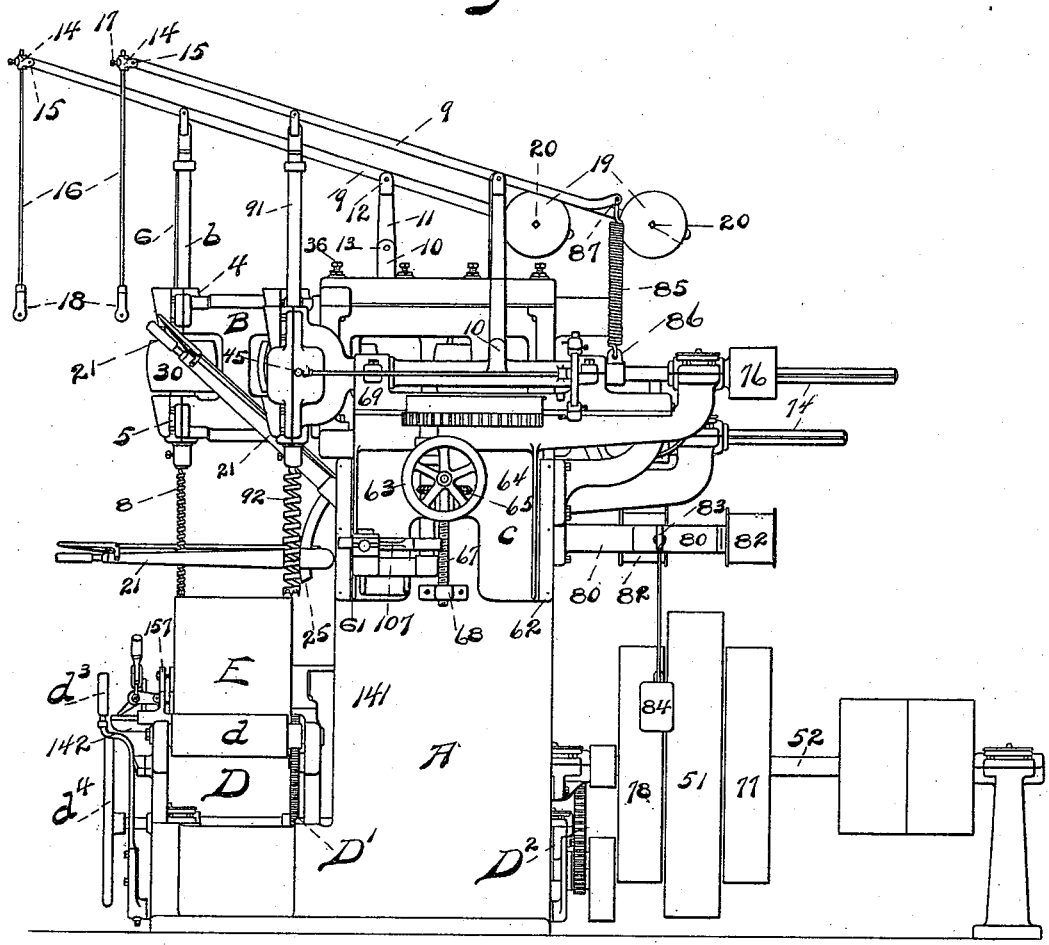

In the drawings, Figure 1 represents a front elevation of our improved machine; Fig. 2 a side elevation, and Fig. 3 a plan view, of the same. Fig. 4 is a detail showing the angling spindle-bearing in side elevation, partly in section. Fig. 5 is a side elevation, partly in section, showing the construction of one of the spindle-rams and connected parts; and Fig. 6, a similar view of the idler-pulley ram. Fig. 7 is a plan view of the clamp for the spindle-ram levers, taken after the lever has been brought to a horizontal position and showing the tongue in cross-section and the levers broken away at both sides of the clamp and Fig. 8, a side elevation of same. Fig. 9 is a section, partly broken, of one of the rams on the line 9 9, Fig. 5. Fig. 10 is a plan view showing the means for adjusting the angling spindle-bearings. Fig. 11 is a side elevation of same, and Fig. 12 a front elevation of same with the spindle-bearings omitted. Fig. 13 is a front elevation, and Fig. 14 a side elevation, showing our improved means for clamping the stock.

A represents the frame of the machine in which one or more rams B B' B² are supported. The rams are adapted to carry boring-spindles $b$ $b'$ $b^2$, mounted in sleeves 3, journaled in bearings 4 5 in the rams. The spindles have a spline 6, sliding in grooves 7 in the sleeves 3. Suitable augers 8 are secured in the spindles. Levers 9 are secured to ears 10 on the frame of the machine by means of links 11, pivoted to the ears by means of pins 12 and to the levers by means of pins 13. Eyelets 14 are pivoted to the outer ends of the levers by means of pins 15. Rods 16 pass through the eyelets and are secured therein at any desired position by means of bolts 17 to bring grips 18 to suitable height for the operator.

The boring-spindles are normally kept in an elevated position by means of weights 19, attached to the rear ends of the levers by bolts 20.

The rams are drawn forward and back transversely of the work by means of shifting-levers 21, mounted on a shaft 22. These levers are preferably in the form of a bell-crank and have a grip 23 and clamping-lever 24, which latter serves to hold the lever to tongues 25 in the position in which it has been placed, thereby holding the rams and boring-spindles in their proper determined position. Links 26 are secured to the levers by means of pins 27 and to the rams by means of pins 28. Each of the spindle-rams is provided with an idler-pulley 29. Pulleys 30 take about the sleeves 3 and are secured thereto. In the operation of the machine the spindle-rams are being continually drawn backward and forward to bring the augers to the correct position to bore the holes in the stock, and it is therefore necessary for the economical operation and the durability of the machine that the rams shall slide easily in their bearings, while providing firmness in position after adjustment. We have therefore provided the novel construction of ram and ways, which we will now explain.

Referring to Fig. 9, we have provided the edges of the rams with V-shaped faces 31 32, preferably sliding in correspondingly-shaped bearings 33 at their lower edges, while their upper edges are supported by bearings 34, consisting, preferably, of a block 35, taking into a groove 35$^\times$ in the frame of the machine. Bolts 36 are adapted to take through the frame of the machine, preferably taking slightly into the blocks 35 to hold the latter against endwise motion and held in position by set-nuts 37. A number of these bolts and set-nuts are provided for each ram, the blocks preferably extending throughout the length of the housing through which the ram passes, giving to the latter a long and uniform bearing. This construction enables the operator to give each point in the bearings of the ram proper nicety of fit and insures the steady, easy, and smooth drawing of the ram into position and firmness in position after it has been adjusted, taking up all lost motion, while providing for ease of operation and causing any wear that may take place to be central of the bearings of the spindles. We prefer to lop off the apex of the V and provide its bearing with a groove 38 of corresponding width and sufficient depth, so as to allow for any wear there may be between the ram and its bearings and to serve as an oil-passage.

B$^3$ is an idler-pulley ram mounted in manner similar to the rams we have just described and is adapted to take up any slack there may be in the belt which operates the boring-spindles $b$ $b'$ $b^2$. It is connected to a link 39, pivoted to it by a pin 40 at one end and at its other to a lever 41 by a pin 42. The lever is preferably in the shape of a bell-crank lever and is pivoted to the frame of the machine by a pin 43 and carries a weight 44. The spindles $b$ $b'$ $b^2$ are operated by means of a belt passing over a pulley 51 on a shaft 52, thence over a pulley 53, mounted at right angles to the latter on a shaft 54, thence around an idler-pulley 55 in the pulley-ram B$^3$, thence in succession over the idler-pulley and the spindle-pulley of the rams B B' B$^2$, thence about the pulley 56, mounted on the shaft 57, and to the pulley 51. This construction gives to the belt a continuous and steady pull, exerting an even tension on the spindles and insuring their steady smooth operation.

In boring certain classes of work, especially bridge and mining timbers, timbers for mill and house construction, car-sills, and other carwork, and for similar purposes for which this machine is especially adapted, it is desirable to bore certain holes at an angle to the line in which the majority of the holes are bored. We therefore provide one or more brackets C C'. They may be adjusted in ways 61, into which projections 62 may take. The adjustment may be by means of a hand-wheel 63, carrying a pinion 64, meshing with a gear 65, mounted on a lug 66 on the bracket, to a screw-shaft 67, taking through a threaded lug 68 in the frame of the machine. A slide 69 slides transversely in ways 70 on the bracket and has journaled thereto a housing 71 in the bearings 72 73. A shaft 74 is journaled in this housing and in a bearing 75 on the bracket. This bearing 75 is transversely stationary on the bracket, allowing the shaft to pass through it lengthwise when the housing is drawn forward and back to bring the auger to position. A pulley 76 is splined to the shaft and is held from end movement by an extension on its hub passing through the fixed bearing. One of these pulleys 76 receives its motion from a pulley 77 on the shaft 52, while the other receives its motion from a pulley 78 on the same shaft. Shafts 79, carrying arms 80, are mounted in the frame of the machine. The arms 80 carry pulleys 81 82 at their respective ends mounted on suitable studs. One side of the arms is preferably extended, forming levers 83, carrying weights 84. These pulleys 81 82 serve as tighteners for the belts passing from the pulleys 77 78 to their respective pulleys 76 on the splined shafts and have large range of adjustment to allow for the raising and lowering of brackets C C' to their limit and accommodate themselves to their adjustment automatically. The housings 71 also carry suitable lugs 10, on which levers 9 may be hung; but in order that the direction of the strain may be continually in the line to which the boring-spindles have been thrown we prefer to draw the spindles on the brackets C C' to normal position by means of springs 85, secured to an eye 86 on the housings 71 and to the levers by an eye 87. The splined shafts 74 carry bevel-pinions 89, meshing pinion-sleeves 90, carrying spindles 91 and adapted to carry augers 92. Splines connect the pinion and the pinion-sleeves.

The slide 69 may be provided with a suitable rack 101, with which a pinion 102 is adapted to mesh, the latter being mounted on a shaft 103, journaled in bearings 104 105 on the bracket. The shaft carries a second pinion 106, which meshes with a geared sector 107, journaled on a stud 108, mounted on a bracket 109 and having a lever 110 attached thereto, and affording an easy and convenient method for drawing the slide 69 forward and back.

In order to throw the spindles to an angle, we have, as already shown and described, mounted the housings 71, carrying the shafts for operating the spindles therein in suitable bearings 72 73. The end of the housings 71 carries suitable casings 111 for protecting the gears inclosed therein and which we prefer to construct integral with the bearings 112 and 113 for the spindles. Secured to the outer end of the housing 71 are grips 114 115 for turning the housing in its bearings. Arced pieces 116 are provided carrying a series of ears 117 118, which may be adjustably attached to the pieces, the ears carrying eyes 120, adapted to receive the end of a rod 122, hung in a bearing 123 and connected to a releasing-lever 124 by means of pins 125 on a stud 126. A spring 127 normally holds the rod 122 into one of the eyes. Stops 128 limit the movement of the housing. The releasing-lever preferably extends in line with one of the grips 114 115, so that it may be readily encircled by the hand with the grip and released at the same time that adjustment was made. We prefer to make the ears 117 stationary on the arced pieces, so that when the rods take into the eye therein the spindles will be in a vertical position. The spindles may be readily thrown to any desired angle by withdrawing the rods from their eyes by depressing the levers and swinging the housings in their bearings through the medium of the grips, and when they have arrived at their proper angle the lever may be released, allowing the rods to drop into the eyes at that point. The stops are preferably set to limit the housing when the spindle is set at an angle of forty-five degrees. It is obvious that instead of the adjustable ears the pieces themselves may be widened and provided with series of eyes and the ears dispensed with.

Referring to Figs. 7 and 8, the clamping-lever 24 is connected to the shifting-lever by a link 130, pivotally attached to both levers. A shoe 131 is pivotally secured to the shifting-lever by a pin 132 and to the clamping-lever by a pin 133 and link 134. A second shoe 135 is pivotally secured to the shifting-lever by a pin 136 and to the clamping-lever by a pin 137 and link 140. The shoes are provided with oppositely-converging faces 138 and 139, which impinge against the tongue 25 and tend to bite the tongue from both directions, holding the lever securely to the tongue. A bolt 147, preferably rigidly secured to the clamping-lever, may serve as a common pivot for the links 130, 134, and 140. The link 130 has a pivotal connection 148 with the shifting-lever 21. The tongue preferably has beveled or receding impinging-faces 149, and the converging faces 138 and 139 on the shoes, adapted to take against the same, are correspondingly shaped. A trip 45 is pivoted to the shifting-lever 21 at 46 and has the shifting-lever 24 pivoted to it at 47.

D is a work-supporting table having a series of rolls $d$, which may be operated by power through a train of gears $D^7$ $D^2$, set in motion by a lever $d^3$ and in the opposite directions or by means of a hand-wheel $d^4$.

The timber E is placed on the table and takes against the rails 141. Slides 142 are provided carrying ratchet-teeth 143. Dovetail gibs 144 slide on ways 145 on the table, so that the slides may be set at any suitable position in the length of the table. A bracket 154 takes about the slides, and flanges 155 take under the slides. Bolts 156 pass loosely through a plate 157, forming part of the bracket, and are secured to a plate 158. Springs 159 encircle the bolts between the plates and normally force the plate 158 away from the plate 157. A pawl 160 is pivoted to a link 161 by a pin 162, and the link is pivoted to an ear 163 on the plate 157 by a pin 164. The bracket 154 carries an upright 165, which has a pin 166 passing therethrough and forming a pivot for a lever 167. A double link 168 is pivotally secured to the lever by a pin 169 and engages with the pin 162, forming the pivot between the link and pawl. When the lever is raised, the pawl drops sufficiently to engage the stop 170 in the link 161, advancing the pawl one or two teeth in the ratchet, according to the position of the stop. The lever is then depressed, which causes a depression of the pin 162, forcing the plate 157 forward against the pressure of the springs 159, holding the stock rigidly in position between the rails and the plate 158. When the lever is depressed, it brings the pivotal point between the link and the pawl below a straight line drawn from the pivotal point of the link and plate to the point of the pawl and locks the clamp in position against the pressure of the springs and timber. This construction forms not only a simple and effective clamp for the work, but enables the placing of the lever in a line with the work convenient to the operator and in position to pass the lever $d^3$ for operating the rolls and to pass the operator without hindrance or danger.

We have shown and described the preferred form of embodiment of our invention. It is obvious that changes in construction may be made without departing from the spirit of our invention.

We claim—

1. In a boring-machine, the combination of one or more boring-spindles operating in a certain plane and sliding in their bearings in that plane, means for adjusting the bearings at substantially right angles to that plane, with an additional boring-spindle normally operating in the first plane and sliding in its bearing in that plane, and means for adjusting its bearing in that plane, and transversely at substantially right angles thereto and also angularly with relation to a plane parallel to the first, substantially as described.

2. In a boring-machine, the combination of a series of boring-spindles, bearings therefor, the boring-spindles constructed and arranged to slide within their bearings, slides for the bearings, means for adjusting the slides in a common direction, in combination with parts shifting one or more of the slides to a different plane, and parts adjusting the bearing or bearings thereon to an angle to the other bearing or bearings, substantially as and for the purpose specified.

3. In a boring-machine, the combination of two or more boring-spindles, constructed and arranged to slide within their bearings, one of the boring-spindles constructed and arranged for having vertical, horizontal and angular adjustments independent of the movement of the same within its bearing, substantially as and for the purpose specified.

4. In a boring-machine, the combination of a frame, a work-support, one or more spindlesupporting slides in the frame adjustable independently transversely of the plane of the work-support, a bearing at the end of each slide overhanging the work-support with a boring-spindle slidably journaled therein transversely of the slide, a support on the frame, means for adjusting the support transversely to the movement of the slide or slides, a slide on the support, means for adjusting the slide transversely of the plane of the work-support in the direction in which the other slides are adjusted, a housing pivotally adjustable on the slide, a bearing thereon overhanging the work-support, with a boring-spindle slidably journaled therein transversely to the housing, substantially as described.

5. The combination, in a boring-machine, of a frame, a table, a series of spindles vertically disposed, bearings therefor, slides for the bearings adjustable transversely of the table, a bracket on the frame, a screw-shaft or similar means for raising and lowering the bracket, a slide on the latter adjustable transversely of the table, a bearing mounted in the slide and adjustable pivotally to the movement of the slide, and a spindle in the bearing, substantially as and for the purpose specified.

6. The combination, in a boring-machine, of a frame a table, a series of spindles vertically disposed, bearings therefor, slides for the bearings adjustable transversely of the table, a bracket on the frame, a screw-shaft or similar means for raising and lowering the bracket, a slide on the latter adjustable transversely of the table, a housing adjustable pivotally therein, a shaft in the housing and a spindle journaled to the housing and operated by the shaft, substantially as and for the purpose specified.

7. In a boring-machine, the combination of a frame, a table, a support, means for adjusting the support on the frame, a slide on the support, means for adjusting the slide transversely of the table, a housing on the slide pivotally adjustable thereon, a bearing thereon extending transversely thereto and pivotally adjustable therewith and carried with the slide in its adjustments transversely of the table, a boring-spindle sliding therein transversely of the housing, and a spring for returning the sliding spindle to normal position, substantially as described.

8. In a boring-machine, the combination of a frame, a table, a support, means for adjusting the support on the frame, a slide on the support, means for adjusting the slide transversely of the table, an operating-shaft for a boring-spindle journaled in the slide, a housing on the slide pivotally adjustable thereabout, a bearing thereon extending transversely thereto and adjustable pivotally therewith and carried with the slide in its adjustments, a boring-spindle sliding therein transversely of the housing and rotated by the shaft, and a bearing on the support for the shaft, substantially as described.

9. In a boring-machine, a frame, a bracket thereon, means for adjusting the bracket vertically, horizontal ways on the bracket, a slide therein, bearings in the slide, a housing pivotally adjustable in the bearings, a bearing on the bracket, a shaft rotatably journaled in the bearings on the slide and sliding in the bearing on the bracket, and a spindle sliding in the housing, substantially as and for the purpose specified.

10. In a boring-machine, a frame, a table, a slide for the same, a bracket thereon, a plate, bolts slidingly connecting the plate and bracket, a spring or springs for yieldingly separating the plate and bracket, a rack in the slide, a pawl, a link, pivotal connections between the latter and the pawl and bracket, and a lever extending longitudinally of the table and connecting with the pivotal point of the link with the pawl, substantially as and for the purpose specified.

11. In a boring-machine, a frame, a table, a slide thereon, a rack on the slide, a pawl, a yielding plate, a link, a pivot between the plate and link, a second pivot between the link and pawl, and a lever extending longitudinally of the table, constructed and arranged for depressing the second pivot below a straight line from the first pivot to the contact-point of the pawl with the rack, substantially as and for the purpose specified.

12. In a boring-machine, a frame, a table, a slide, a rack, a pawl, a yielding plate, a link, a pivot between the link and plate, a second pivot between the link and pawl, a lever fulcrumed on the slide and pivoted to the link, and extending longitudinally of the table, substantially as and for the purpose specified.

JOHN R. THOMAS.
HARRY S. SPENCER.

Witnesses:
THOMAS P. EGAN,
PARKE S. JOHNSON.